United States Patent [19]

Mijs et al.

[11] 4,008,192

[45] Feb. 15, 1977

[54] POLYISOCYANATES BLOCKED WITH HYDROXAMIC ACID ESTERS OR ACYL HYDROXAMATES

[75] Inventors: Willem Jacobus Mijs, Rozendaal (Gld.); Johan Bernard Reesink, Didam (Gld.), both of Netherlands

[73] Assignee: Akzo N.V., Arnhem, Netherlands

[22] Filed: Nov. 28, 1975

[21] Appl. No.: 635,986

[30] Foreign Application Priority Data

Dec. 3, 1974 Netherlands ............ 7415726

[52] U.S. Cl. ............ 260/18 TN; 260/77.5 TB; 260/77.5 CR; 260/77.5 AB
[51] Int. Cl.$^2$ ........................... C08G 18/04
[58] Field of Search ............ 260/77.5 CR, 77.5 TB, 260/77.5 UA, 18 TN, 77.5 AB

[56] References Cited

UNITED STATES PATENTS

| | | | |
|---|---|---|---|
| 2,882,260 | 4/1959 | Bartl et al. | 260/77.5 TB |
| 3,499,852 | 3/1970 | Schroeder et al. | 260/77.5 TB |
| 3,694,389 | 9/1972 | Levy | 260/77.5 AB |
| 3,748,315 | 7/1973 | Wooster | 260/77.5 TB |
| 3,867,347 | 2/1975 | Felber et al. | 260/77.5 TB |
| 3,926,875 | 12/1975 | Tsugukuni et al. | 260/18 TN |
| 3,931,117 | 1/1976 | Leonard | 260/77.5 TB |

OTHER PUBLICATIONS

Journal of Organic Chemistry, vol. 27, p. 3131, (1962), by J. Cooley.

Primary Examiner—Eugene C. Rzucidlo
Attorney, Agent, or Firm—Stevens, Davis, Miller & Mosher

[57] ABSTRACT

A thermosetting coating composition contains a polyisocyanate blocked with a hydroxamic acid ester or an acyl hydroxamate. The polyisocyanate in the coating composition may be activated by dissociation of the blocking agent and polyisocyanate at a lower temperature than the blocked polyisocyanate of conventional coating compositions.

15 Claims, No Drawings

POLYISOCYANATES BLOCKED WITH HYDROXAMIC ACID ESTERS OR ACYL HYDROXAMATES

This invention relates to a process for the preparation of thermosetting coating compositions wherein a blocked polyisocyanate is incorporated in a polymer having free hydroxyl groups.

Such a process is known for instance from the German Patent Specification 718,822. As examples of the prior art blocking agents for the diisocyanate or higher functional polyisocyanate may be mentioned tertiary alcohols, secondary aromatic amines, mercaptans, lactams, monohydric phenols and imides. In practice it is often found preferable to block the polyisocyanate by reaction with a monohydric phenol.

The most important disadvantage to the use of blocked polyisocyanates in coating compositions is the relatively high temperature required to dissociate the blocking agent and polyisocyanate when it is desired to activate the polyisocyanate. The dissociation temperature for a phenol blocked polyisocyanate is at least 150° C. For this reason it has in the past been proposed to use thiophenols, for which the dissociation temperature is much lower. The disadvantage to the latter, however, is its extraordinarily unpleasant odor.

It has also been proposed to add 1 or 2 percent of a catalyst to the blocked polyisocyanate to reduce the dissociating or deblocking temperature to 125°–140° C. In this way, however, the pot life of the uncured coating is unfavorably influenced.

It is an object of this invention to provide a process for making thermosetting coating compositions which is devoid of these disadvantages.

Another object of the invention is to provide an improved process for making coating compositions containing a blocked polyisocyanate.

The foregoing objects and others are accomplished in accordance with this invention by providing a process for making coating compositions containing the reaction product of an organic polyisocyanate and a hydroxamic acid ester or an acyl hydroxamate. Surprisingly, a polyisocyanate blocked with one of these compounds is found to be practically completely dissociated after about 30 minutes at a temperature of about 130° to 140° C. into the polyisocyanate and blocking agent.

The reaction between an isocyanate and a hydroxamic acid ester is disclosed in an article by J. Cooley in J. Org. Chem. 27, 3131 (1962). It is known from this article that upon mild heating, particularly under reduced pressure, a phenyl carbamoylhydroxamic ester is decomposed into phenyl isocyanate and the corresponding ester. However, no mention is made in the article of the application of the esters in coating compositions. Nor does it furnish any data which would make such an application particularly obvious to a man skilled in the art.

Although any suitable ester of hydroxamic acid or any suitable acyl hydroxamate may be used in the process provided by the invention, it will, in practice, be preferred to use a compound which corresponds to the following formula for blocking the polyisocyanate

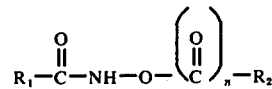

wherein $n=0$ or 1 and $R_1$ and $R_2$ each represent hydrocarbon group containing 1 to 20 carbon atoms. $R_1$ is preferably an alkyl group, an aralkyl group, an aryl group or cycloalkyl group which may have one or more ethylenically unsaturated groups. If desired, $R_1$ may carry substituents, provided that the quality of the coating is not impaired. As examples of suitable substituents may be mentioned the halogens, fluorine, chlorine, bromine or iodine; nitro groups, cyano groups and alkoxy or alkanoyl groups. $R_2$ is preferably an alkyl group, a cycloalkyl group or an aralkyl group which, too, may have one or more ethylenically unsaturated groups. $R_2$ may have the substituents indicated above for $R_1$. If $n=1$, $R_2$ also may represent an aryl group.

In view of environmental protection problems, it is much preferred nowadays to use solvent-poor coating compositions. For the same reason the aim will be to give the blocking agent such a structure that the chance of its disappearing from the coating is reduced to practically nil.

One solution to this problem is to use for $R_1$ and $R_2$ hydrocarbon groups with a large number of carbon atoms which may be substituted if desired with, for instance, halogen atoms. A disadvantage to the presence of hydroxamic esters or acyl hydroxamates with such a structure is that they may bring about a substantial change in the physical properties of the coatings (softener effect).

To meet this drawback the invention provides a process in which use is made of a blocking agent containing one or more ethylenically unsaturated groups. The use of a radical initiator may cause them to be activated and to be bonded chemically to reactive groups contained in the coating. It has been found that favorable results are obtained by application of hydroxamates of the above structural formula, where $R_1$ represents an alkenyl group with not more than 6 and by preference 2 or 3 carbon atoms. The preparation of the last-mentioned compounds may, for instance, be carried out in such a way that first of all the hydroxamic acids are prepared in accordance with the British Patent Specification 852,176 by reacting the alkyl esters or the alkoxyalkyl esters of acrylic, methacrylic or crotonic acid with hydroxylamine in the presence of aqueous alkali.

Subsequently, as described in an article by J. Cooley in J. Org. Chem. 25, the alkali salts of the hydroxamic acids thus obtained can be brought into reaction with an alkyl halide or an aralkyl halide to form the corresponding esters.

The resulting hydroxamic acids also may be allowed to react with an acid chloride to form the corresponding acylhydroxamates, use being made of a method known in itself. To this end, for instance, an aqueous solution of the sodium salt of the respective hydroxamic acid is, with vigorous stirring, brought into contact with an equimolar amount of an acid chloride dissolved in a water-immiscible solvent such as methylene chloride. In this way it is possible in a relatively simple manner to prepare a blocking agent of the present type, with $R_2$ containing one or more unsaturated groups. Acid chlorides derived from the lower unsaturated fatty acids such as acrylic acid, methacrylic acid and crotonic acid are especially suitable for this purpose. As other examples of suitable acid chlorides may be mentioned, those that are derived from higher unsaturated fatty acids such as oleic acid, linolenic acid and the like. If the use of hydroxamic acid esters with $R_2$ containing an ethylenically unsaturated group is considered, then it would be highly preferable to choose allyl hydroxamates, particularly because of the high reactivity of the allyl chloride employed in the preparation thereof. In the aforementioned article by J. Cooley examples are given of the preparation of a few allyl hydroxamates, namely of allyl anisohydroxamate, allyl benzohydroxamate and allyl proprionhydroxamate.

The use of allyl hydroxamates in the present process is considered very attractive because under the influence of a radical initiator these compounds can very readily be bonded to reactive groups present in the coating.

In addition to compounds of hydroxamic acid with $R_2$ containing ethylenically unsaturated groups there should be mentioned the use of compounds of hydoxamic acid, where $R_2$ is a benzyl group if $n=0$ or a phenyl group if $n=1$. The preparation of these compounds is started from the highly reactive benzyl chloride and benzoyl chloride, respectively. The hydroxamic acid compounds derived from the last-mentioned compounds have been found to be very suitable for the present application.

If, however, only a compound is available of which the chloride is less reactive, then use may with advantage be made of the corresponding bromide or iodide.

Besides the afore-mentioned hydroxamic esters or acyl hydroxamates other ethylenically unsaturated compounds may be incorporated in the thermosetting coating compositions according to the invention. This type of compound has the advantage that as a monomer it plays the role of a solvent, so that in the coating compositions no or very little solvent need be incorporated which upon curing of the coating will evaporate and get into the atmosphere. In this connection, mention is made of unsaturated polyesters containing free hydroxyl groups dissolved in monostyrene, solutions of oligomer acetates in monoacrylic esters or methacrylic esters, or solutions of polyepoxides in epichlorohydrin.

In all of these cases a monomer polymerizable under the influence of a radical initiator is still present as well as a polymer with free hydroxyl groups. At reduced temperature this monomer serves as a solvent and at an elevated temperature it copolymerizes along with the blocked or deblocked unsaturated hydroxamic ester or acyl hydroxamate.

By polymers with free hydroxyl groups are to be understood all possible polyhydroxyl compounds that react with an isocyanate group to form a urethane. As examples of suitable organic compounds containing free hydroxyl groups may be mentioned, straight or branch chained saturated or unsaturated polyesters, polyester amides, polyamides containing hydroxyl groups, which may be prepared for instance by condensation of polyhydric alcohols with polybasic acids with simultaneous incorporation of diamines and amino alcohols, polyalcohols including, for instance, cellulose and compounds derived therefrom and polyvinyl alcohol, alkyd resins in which saturated or unsaturated acids are incorporated, polyethers with terminal hydroxyl groups, polythioethers with terminal hydroxyl groups, phenol formaldehyde resins, xylene formaldehyde resins, urea formaldehyde resins and epoxy resins in which natural and/or synthetic resins may be incorporated. For use in coatings polyhydroxy acrylates are found to be particularly advantageous.

Although preference is given to the use of solvent-free systems or systems in which the solvent is incorporated in the coating by polymerization or copolymerization, it will be obvious that within the scope of the present invention it is also possible to make use of solvent systems. As examples of suitable organic solvents may be mentioned, ethylene dichloride, chloroform, dimethyl formamide, the dimethyl ethers and the diethyl ethers of ethylene glycol, nitromethane, ethylene glycol diacetate, benzyl benzoate, benzene or toluene, ethyl acetate, carbon tetrachloride, methyl acetate or xylene. In the case of the presence of solvents that react with isocyanates, these solvents must be removed before deblocking sets in.

The amount of blocked isocyanate to be incorporated in the coating compositions according to the invention is preferably so chosen that the ratio of the NCO-groups liberated upon deblocking to the free hydroxyl groups present in the coating is between 0.8 : 1 and 1.2 : 1.

For the process according to the invention use may be made of all kinds of isocyanates, provided that they are at least bifunctional. As examples of suitable polyisocyanates may be mentioned, hexamethylene-diisocyanate, m-phenylene diisocyanate, 1-alkyl benzene-2,4-diisocyanate, 1-alkyl benzene-2,5-diisocyanate, 2,6-dialkyl benzene-1,4-diisocyanate, 1 chlorobenzene-2,4-diisocyanate, dicyclohexyl methane diisocyanate, 3,3'-dimethoxydiphenylmethane-4,4'-diisocyanate, 1-alkyl benzene-2,6-diisocyanate, m-xylene diisocyanate, 2,4-4'triisocyanatodiphenyl ether, and the like. The alkyl group in the above alkyl or dialkyl benzene diisocyanates may be methyl, ethyl or the like. In the case where demands are made on light fastness, it is preferred to use a polyisocyanate with exclusively aliphatically or cycloaliphatically bonded isocyanate groups. As examples may be mentioned a biuret polyisocyanate mixture substantially consisting of tri(isocyanatohexyl)biuret, 4,4'-diisocyanato dicyclohexyl methane and isophoron diisocyanate. Besides polyisocyanates, the coating may, if desired, contain monofunctional isocyanates. They may be used, for instance, to impart a higher solubility to the polymer with free hydroxyl groups. For the same reason it may be desirable for the coating compositions to contain a mono- and/or a polyfunctional alcohol having a molecular weight < 200. In this way the viscosity of the coating composition may be controlled within narrow limits without having to make use of solvents which are not or are only partly taken up in the cured coating. In the coating compositions according to the invention there also may be incorporated pigments and fillers in the manner commonly used in the coating industry.

The coating compositions may comprise the usual starting materials and adjuvants, for instance cellulose esters, levelling agents, silicon oils, resins and the like. A catalytic amount of any suitable catalyst for the preparation of polyurethanes may be used.

If in the coating composition according to the invention also a radical initiator is incorporated, it is to be preferred to select one which displays its activity at a lower temperature than the deblocking temperature of the blocked hydroxamic esters or acyl hydroxamates.

Suitable radical initiators for this purpose are, inter alia, particular organic peroxides or 1,2-diaryl-1,2-dicyano compounds according to the U.S. Pat. No. 3,726,837.

Examples of suitable organic peroxides are diisopropyl benzene di-tert.butyl peroxide, methylethylketone peroxide, dibenzoyl peroxide, dilauryl peroxide, and the like. Besides, there may be incorporated the compounds that activate polymerization, more particularly compounds containing cobalt or vanadium or aromatic amines such as, for instance, dimethyl aniline. Besides, there may be incorporated co-catalysts such as ascorbic acid or acetoacetyl dimethylamide.

Under same circumstances it may be desirable that the deblocking temperature of the adduct should be further reduced. To this end the invention provides a process in which in the coating composition according to the invention a catalytic amount of a zinc compound is incorporated. The use of an amount in the range of about 0.1 to 0.2 molar equivalents of the number of free OH groups or blocked isocyanate groups present in the coating will result in a reduction of the deblocking temperature to about 100° C. This zinc addition more particularly results in the pot life of the non-cured coating changing very little if at all. Although the form in which the zinc may be added may vary, it is preferred that it should be added in the form of the salt of an organic acid. Particularly favorable results are obtained with salts of organic acids having 2 to 20 carbon atoms because of their being easily mixed with the other constituents contained in the coating. In order to accelerate the reaction between the isocyanate and free hydroxyl groups there may be incorporated catalysts such as soaps of metals selected from the groups 1, 2 and 4 and the sub-group B of the periodic system of elements.

For the preparation of the coating compositions according to the invention the procedure is generally as follows. First the polyisocyanate is allowed to react with a hydroxamic acid ester or acyl hydroxamate and the resulting compound is finally taken up in the total composition. If desired, a partly blocked polyisocyanate may be allowed previously to react with oligomers or polymers containing free hydroxyl groups in order that a better solubility of the latter may be obtained in the composition or in order that the rheological properties of the composition may be influenced.

The invention will be further described in the following examples, which of course must not be interpreted as limitative of the present invention.

The test methods mentioned in the following examples were all carried out in conformance with the ASTM and the DIN standards indicated. The Persoz hardness was determined in accordance with the French NF standard T30–016.

The following polyesters and polyisocyanates were used in the examples below.

POLYESTER I

Polyester of 46.2 mole % isophthalic acid, 46.2 mole % 2,2-dimethyl-3-hydroxypropyl 2,2-dimethyl-3-hydroxypropionate and 7.6 mole % of trimethylol propane. The hydroxyl number was 78.5 and the molecular weight 2130.

POLYESTER II

Polyester of 42.7 mole % isophthalic acid, 10.7 mole % azelaic acid, 35.0 mole % 2,2-dimethyl-3-hydroxypropyl 2,2-dimethyl-3-hydroxypropionate and 11.6 mole % trimethylol propane. The hydroxyl number was 105 and the molecular weight 3650.

POLYESTER III

Polyester made up of a mixture of 50% by weight of polyethylene adipate and 50% by weight of a polyester obtained by polycondensation of adipic acid, $C_7$ - $C_9$ saturated fatty acid, trimethylol propane and citric acid.

The hydroxyl number of the mixture was 237.

POLYISOCYANATE I

A biuret polyisocyanate mixture substantially consisting of tri(isocyanatohexyl)biuret.

POLYISOCYANATE II

Isophoron diisocyanate.

POLYISOCYANATE III 2,6-toluene diisocyanate.

The solvent-content of the coating compositions in the undermentioned examples varied between about 30 and 50% by weight. The solvent was in most cases a 50—50 weight mixture of xylene and ethyleneglycolmonoethyl ether acetate.

EXAMPLE I

Preparation of benzyl methacrylo hydroxamate (BMH)

To a solution of 2.8 kg of hydroxylamine hydrochloride in 6 liters of water there were added, in three steps and with stirring, 4 kg of methyl methacrylate at a temperature of −5° C. Over a period of 1¼ hours there were subsequently added, with vigorous stirring while maintaining a temperature in the range of −5° C. to 0° C. a solution of 1.6 kg of NaOH in 2.8 liters of water, after which the mixture was kept within this temperature range for 1½ hours, with vigorous stirring.

At a temperature < 10° C. another solution of 1.6 kg of NaOH in 2.8 liters of was as added over a period of approximately 1 hour, after which the mixture was stirred for about 16 hours at a temperature of 0° C.

Following the addition of an aqueous solution containing 5.4 kg of $Na_2CO_3.10\ H_2O$ there were added at a temperature of < 10° C. 30 liters of methanol and 6 kg of benzyl chloride and the resulting mixture was stirred for 18 hours. After isolation of the methanol by vacuum distillation the reaction mixture separated into two layers.

From the organic layer there formed a crystal mass which, after filtration, drying and recrystallization from toluene gave a yield of 4.458 kg of benzylmethacrylo hydroxamate with a melting point in the range of 80.6° to 82.8° C.

EXAMPLE II

Preparation of isocyanate blocked with benzylmethacrylo hydroxamate 2.248 kg of a 75% by weight solution of polyisocyanate I in xylene/ethyleneglycolmonoethyl ether acetate were reacted for 1 hour at 80° C., with continuous stirring and under a nitrogen atmosphere, with 1.640 kg of benzylmethacrylo hydroxamate of Example I.

After completion of the reaction it was found that the isocyanate groups were completely blocked.

EXAMPLE III

Preparation of isocyanate blocked with allyl methacrylo hydroxamate 60 g of a 75% by weight solution of polyisocyanate I in xylene/ethylene glycol monoethylether acetate were diluted with 100 ml of benzene.

Subsequently, the resulting solution was reacted over a period of 1 hour at a temperature of 80° C. and under an atmosphere of nitrogen with 32.8 g of allyl methacrylo hydroxamate, with continuous stirring. Upon analysis it was found that the NCO-group was completely blocked.

EXAMPLE IV

Preparation of isocyanate blocked with benzylmethacrylo hydroxamate 220 g of polyisocyanate II were mixed with 80 ml of xylene. Subsequently, there were added 382 g of benzylmethacrylo hydroxamate. The resulting mixture was kept at 80° C for 2 hours under an atmosphere of nitrogen. When the reaction was completed, it was found by analysis that the isocyanate groups of the polyisocyanate were completely blocked.

EXAMPLE V 139.3 g of polyester I were mixed with 99 g of titanium white (rutile) and ground.

Subsequently, there were added 75.5 g of the blocked isocyanate prepared in Example II. The ratio of the blocked NCO-groups to free OH-groups was about 1 : 1. The organic coating was diluted with ethylene glycol monoethyl ether acetate to a viscosity corresponding to an efflux time of 25 seconds for a No. 4 Ford viscosity cup.

The coating composition thus prepared was applied to a phosphated iron test panel and cured for 30 minutes at 130° C. The properties of the film of paint thus obtained were as follows:

| | | |
|---|---|---|
| thickness measured | ASTM D1186-53 | 40 μm |
| Persoz hardness | NF T30-016 | 268 seconds |
| conical mandrel test | ASTM 522-60 | adequate |
| adhesion test | DIN 53-151 | adequate |
| | | >74 in.lb |
| falling-weight test | ASTM D2794-69 male punch ⅝ inch, female die 0,640 inch | |
| Erichsen indentation test | DIN 53-156 | 9 mm |

The film of paint obtained was unaffected by solvents.

EXAMPLE VI 139.3 g of polyester II were mixed with 106.5 of titanium white (rutile) and ground.

Subsequently, there were added 101.5 g of the blocked isocyanate prepared in Example II. The ratio of blocked isocyanate to free hydroxyl groups was about 1 : 1. The organic coating was diluted in the same way and to the same viscosity as indicated in Example V. Also the film was tested in the same way and the following properties were measured by the test methods mentioned in Example V.

| | |
|---|---|
| thickness | 45 μm |
| Persoz hardness | 187 seconds |
| conical mandrel test | adequate |
| adhesion test | adequate |
| falling-weight test | > 74 in.lb |
| Erichsen indentation test | 9 mm |

EXAMPLE VII 150 g of polyisocyanate I were blocked in the same way as described in Example II with benzylmethacrylo hydroxamate. The blocked polyisocyanate was mixed with 34 g of polyester III, 52 g of trimethylol propane diacrylate, 40 g of hexane diol monomethacrylate, 29 g of hexanediol dimethylacrylate and 1.2 g of 1,2-dicarbomethoxy-1,2-dicyano-4,4-dimethyl-diphenyl-ethane. The last-mentioned compound is a radical initiator whose activity sets in at a temperature of about 70° C.

Subsequently, there were added 458 g of titanium white (rutile), after which the entire mixture was ground. With the aid of m-xylene the viscosity of the composition was brought to a value which corresponds to an efflux time of 25 seconds for a No. 4 Ford viscosity cup. The coating composition was applied to a phosphated iron test panel and kept at 130° C. for 30 minutes. The film obtained was found to be immune to solvents. The properties of this film showed the following values:

| | |
|---|---|
| thickness | 31 μm |
| Persoz hardness | > 200 seconds |
| conical mandrel test | adequate |
| adhesion test | adequate |
| falling-weight test | > 74 in.lb |
| Erichsen indentation test | 8 mm |

EXAMPLE VIII 111 g of polyisocyanate II were blocked with benzylmethacrylo hydroxamate as indicated in Example II. The blocked product was mixed with 59 g of polyester III, 91 g of trimethylol propane diacrylate, 70 g of hexane diol monomethylacrylate, 51 g of hexane diol dimethacrylate and 2.1 g of the same radical initiator as used in Example VII. Subsequently, there were added 458 g of titanium white (rutile), after which the resulting mixture was ground.

With the aid of m-xylene the viscosity was again brought to a value corresponding to an efflux time of 25 seconds for a No. 4 Ford viscosity cup. After the coating composition had been applied to a phosphated iron test panel, it was cured for 30 minutes at 130° C.

The properties of the film of paint were as follows:

| | |
|---|---|
| thickness | 30 μm |
| Persoz hardness | 200 seconds |
| conical mandrel test | adequate |

| | |
|---|---|
| adhesion test | adequate |
| falling-weight test | > 74 in.lb |
| Erichsen indentation test | 9 mm |

The film obtained was immune to solvents.

EXAMPLE IX 43.5 g polyisocyanate III were dissolved in 60 g of a 50—50 mixture of xylene and ethylene glycol monoethyl ether acetate. Subsequently, there were added 95.5 g of benzylmethacrylo hydroxamate, after which the mixture was kept at 80° C. for 1 hour. Then a 50% by weight polymer solution in xylene was prepared by copolymerization of 13.5 g of methylmethacrylate, 37 g of styrene, 14.5 g of 2-hydroxypropylmethacrylate and 1.5 g of methacrylic acid. The hydroxyl number of the polymer thus prepared was 57.

5 g of this polymer solution were mixed with 2.4 g of solution of the blocked isocyanate. After the coating composition had been applied to a phosphated iron test panel, it was cured for 30 minutes at 130° C. The properties of the film were as follows:

| | |
|---|---|
| thickness | 17 μm |
| Persoz hardness | 368 seconds |
| conical mandrel test | adequate |
| adhesion test | adequate |
| falling-weight test | 15 in.lb |
| Ehrichsen indentation test | 6.2 mm |

EXAMPLE X

Preparation of N-benzoylaceto hydroxamate (BOAH)

The sodium salt of hydroxamic acid, viz. sodium acetohydroxamate, was prepared in the same way as indicated in Example I.

To the aqueous solution of this salt there was added methylene chloride. Subsequently, there was added dropwise at a temperature in the range of 20° to 25° C., with vigorous stirring, a solution containing an equivalent amount of benzoyl chloride in methylene chloride. Stirring was continued for a further period of 30 minutes at room temperature and the water layer acidified to Congo red. The organic layer was separated and washed with water. After drying with magnesium sulphate the methylene chloride was evaporated off. The residue was purified by recrystallization from toluene. N-benzoyl aceto hydroxamate was obtained in 52% yield. The melting point was 95.9° – 97.8° C.

EXAMPLE XI

Preparation of isocyanate blocked with N-benzoyl acetohydroxamate 86.8 g of a 20% by weight solution of polyisocyanate I in xylene/ethylene glycol monoethyl ether acetate and butyl acetate were reacted with 44.8 g of N-benzoyl acetohydroxamate for 1 hour at 80° C. under an atmosphere of nitrogen. Upon analysis it was found that the NCO-group was completely blocked.

EXAMPLE XII 5 g of the same polymer solution as used in Example IX were mixed with 10.5 g of the blocked polyisocyanate prepared in accordance with Example XI. The coating composition was applied to a phosphated iron test panel and cured for 130 minutes at 130° C.

The properties of the film were as follows:

| | |
|---|---|
| thickness | 15 μm |
| Persoz hardness | 359 seconds |
| conical mandrel test | adequate |
| adhesion test | adequate |
| falling-weight test | >74 in.lb |
| Ehrichsen indentation test | 8.8 mm |

The film was found to be immune to solvents.

EXAMPLE XIII

A coating composition was prepared in accordance with the process indicated in Example VI. Moreover, 21 ml of a solution of zinc naphthenate in white spirit (8 % by weight of zinc) was incorporated in it.

After the coating composition had been diluted in the same way and to the same viscosity as indicated in Example V, two layers of coating were applied to a test panel and cured for ½ hour at 110° C. and 130° C., respectively.

The following properties were measured in accordance with the measuring methods indicated in Example V.

| Properties | Curing | Temperature |
|---|---|---|
| | 110° C. | 130° C. |
| thickness (μm) | 30 | 30 |
| Persoz hardness (seconds) | 182 | 216 |
| conical mandrel test | adequate | adequate |
| adhesion test | adequate | adequate |
| falling-weight test (in.lb) | > 74 | > 74 |
| Erichsen indentation test (mm) | 9 | 9 |

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. A process for the preparation of thermosetting coating compositions comprising incorporating in a polymer having free hydroxyl groups an organic polyisocyanate blocked with a hydroxamic acid ester or an acyl hydroxamate.

2. The process of claim 1 wherein the polyisocyanate is blocked with a compound which corresponds to the structural formula

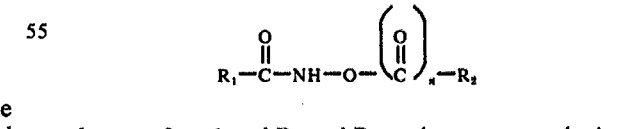

where $n=0$ or 1 and $R_1$ and $R_2$ each represent a hydrocarbon group containing 1 to 20 carbon atoms.

3. The process of claim 2, wherein $R_1$ represents an alkenyl group containing no more than 6 carbon atoms.

4. The process of claim 2 wherein $n=0$ and $R_2$ is a benzyl group.

5. The process of claim 2 wherein $n=1$ and $R_2$ is a phenyl group.

6. The process of claim 2 wherein $R_2$ is an alkenyl group or an aralkenyl group.

7. The process of claim 3 wherein the coating composition contains a radical initiator which is active at a temperature below about 130° C.

8. The process of claim 1 wherein the polyisocyanate contains only aliphatically or cycloaliphatically bonded isocyanate groups.

9. The process of claim 8 wherein the polyisocyanate consists essentially of tri(isocyanatohexyl)-biuret formed by reaction of hexamethylene diisocyanate with water.

10. The process of claim 1 wherein the coating composition contains an alcohol having a molecular weight of less than 200.

11. The process of claim 1 wherein the coating composition contains a catalytic amount of a zinc compound.

12. The process of claim 11 wherein the amount of zinc included in the coating composition is about 0.1 to 0.2 molar equivalents of the number of free OH groups or blocked isocyanate groups present in the coating.

13. The process of claim 11 wherein the zinc compound is a salt of an organic acid containing 2 to 20 carbon atoms.

14. The process of claim 2 wherein $n=0$ and $R_2$ is an allyl group.

15. The product of the process of claim 1.

* * * * *